United States Patent [19]
Suzuki et al.
[11] 3,971,043
[45] July 20, 1976

[54] APPARATUS FOR MAKING ELECTROLUMINESCENT SCREENS FOR COLOR CATHODE RAY TUBES

[75] Inventors: Takeshi Suzuki, Fukaya; Shigeo Takenaka, Kanagawa; Hiroshi Tanaka, Fukaya; Masanori Akiyama, Honjo, all of Japan

[73] Assignee: Tokyo Shibaura Electric Co., Ltd., Kawasaki, Japan

[22] Filed: May 5, 1975

[21] Appl. No.: 574,637

Related U.S. Application Data

[62] Division of Ser. No. 390,253, Aug. 21, 1973, Pat. No. 3,888,673.

[30] Foreign Application Priority Data

Aug. 21, 1972 Japan .............................. 47-82832
Aug. 22, 1972 Japan .............................. 47-83711

[52] U.S. Cl. .............................. 354/1; 96/36.1; 355/71
[51] Int. Cl.² .............................. G03B 41/00
[58] Field of Search .......... 354/1; 355/71; 96/36.1; 427/54; 313/402, 403; 117/33.5 CM

[56] References Cited

UNITED STATES PATENTS 2,936,682 5/1960 Krawitz .............................. 96/36.1
3,563,737 2/1971 Jonkers .............................. 96/36.1
3,667,947 6/1972 McKee .............................. 96/36.1
3,725,106 4/1973 Hosokoshi .............................. 96/36.1
3,736,848 6/1973 Tsuneta et al. .............................. 427/54

*Primary Examiner*—Richard A. Wintercorn
*Attorney, Agent, or Firm*—Schuyler, Birch, Swindler, McKie & Beckett

[57] ABSTRACT

An electroluminescent screen for a color cathode ray tube of the shadow-mask type having a plurality of light absorbing stripes and elemental light emitting electroluminescent stripes each separated by one of the light absorbing stripes is produced by locating a movable shield plate between a light source and shadow mask, the shield having an opening for limiting the path of light between the light source and the shadow mask. The shield plate is moved so as to move the irradiated area on the shadow mask along the length of rows of apertures of the mask. The light source is gradually inclined synchronously with the moving of the irradiated area on the shadow mask to be kept always substantially parallel to the rows of apertures in the irradiated area. The light source has a substantial longitudinal length and narrow width and moves transversely with respect to that length with predetermined amplitude and frequency during movement of the irradiated area across the mask. The light may be so formed that the light emitted from both ends is more intense than that emitted from the center portion thereof.

15 Claims, 14 Drawing Figures

APPARATUS FOR MAKING ELECTROLUMINESCENT SCREENS FOR COLOR CATHODE RAY TUBES

This is a division of application Ser. No. 390,253, filed Aug. 21, 1973, now U.S. Pat. No. 3,888,673 issued June 10, 1975.

BACKGROUND OF THE INVENTION

This invention relates to a method of fabricating electroluminescent screens for color cathode ray tubes.

DESCRIPTION OF THE PRIOR ART

Color cathode ray tubes are known which include a shadow mask having a plurality of circular apertures and a luminescent screen comprising a plurality of clusters of red, blue and green phosphor dots, and a light absorbing portion contiguous to the phosphor dots. One disadvantage of this tube is a small tolerance or allowance for electron beam landing errors. Thus, an electron gun mount is necessary having a very percise configuration; such tubes also require a plurality of beam adjusting means, such as a lateral or tangential beam convergence yoke, to utilize the tube in a color television receiver.

Recently, a color cathode ray tube comprising a luminescent screen including a plurality of phosphor stripes, and light absorbing stripes contiguously disposed thereto; a shadow mask having apertures arranged in rows, each aperture having a substantial vertical length and a small width; and a so called "in-line triple gun" mount was successfully developed to eliminate the disadvantages of the aforementioned color tubes.

The luminescent screen of this newly developed color tube has a plurality of luminescent stripes extending from the upper end to the lower end of the tube panel, emitting red, green and blue light respectively when irradiated with electron beams. Each of the luminescent stripes neighbours or is disposed contiguously to a light absorbing stripe which also extends between the upper and lower ends of the tube panel. The shadow mask of this color tube has a plurality of electron beam passable apertures of rectangular configuration, each aperture having a substantial length in the vertical direction (Y-direction) and narrow width in the horizontal direction (X-direction). The apertures are disposed substantially parallel to each other and some of them are aligned in rows separated by bridging portions. The bridging portions strengthen the shadow mask, which is formed in a spherical configuration, the concave side thereof facing the gun mount.

The triple electron gun mount has three unitary electron guns, each gun axis being disposed in horizontal plane including the tube axis, with angles between neighboring unitary electron guns being such as that the electron beams emitted from the guns are to be converged on the shadow mask.

The aforementioned newly developed color cathode ray tubes are successfully used; but problems arise in the manufacturing process of the luminescent screen as are mentioned hereinbelow.

The light absorbing stripes and the luminescent stripes emitting red, green and blue light when irradiated with electron beams must be disposed at a predetermined pitch and must have substantially a linear configuration of a predetermined width. Moreover, in considering the allowable tolerance or allowance for beam landing error in tube operation, the width of the luminescent phosphor stripes (i.e., the spacing between adjacent light absorbing stripes) must be gradually narrower at the ends of the screen in the horizontal direction; in other words, the light absorbing stripes disposed on the sides of the screen must have a larger width than those in the central portion. If these conditions are met, the electron beams can correctly irradiate the luminescent stripes.

In this case, light emitting areas of the phosphor screen are determined by the spacing between two adjacent light absorbing stripes. When an unevenness or lack of uniformity in the width of luminescent stripes exists in the configuration of the luminescent screen, the image tends to show some unevenness or lack of uniformity and the image quality may be greatly reduced. The unevenness or lack of uniformity in the width of luminescent stripes or the spacing between adjacent light absorbing stripes must be eliminated or reduced to the level of not attracting any attention.

The unevenness or lack of uniformity in the luminescent stripes on the screen can be divided into three kinds:

1. unevenness appearing irregularly in all parts of the luminescent screen;
2. unevenness appearing gradually in the areas far removed from the X — Y axes on the luminescent screen surface (i.e., in the corners of the screen); and,
3. unevenness appearing at a point on the screen opposite the bridge portion of the shadow mask.

With respect to the unevenness or lack of uniformity described above, the first kind of unevenness is the most serious because it appears at random almost all over the screen, and in some cases, the manufacture of the screen becomes impossible. The second kind of unevenness is also a matter of substantial importance because substantially large beam landing tolerance or allowance is necessary in the four corners of the screen, making the color purity adjustment of a receiver difficult.

SUMMARY OF THE INVENTION

Accordingly, the object of this invention is to eliminate or substantially reduce the unevenness in the luminescent stripes of the phosphor screen of the aforementioned first, second and third kinds separately or at the same time.

A further object of this invention is to provide an easily operable color catode ray tube having good imaging characteristics.

According to this invention, there is provided a shield plate between a shadow mask which is attached to a panel which is the base for the luminescent screen being made, and a light source, in an exposing chamber. The shield plate is movable in the longitudinal direction of the apertures in the shadow mask. The shield plate has an opening extending in a direction perpendicular to its direction of movement. The light source has a substantial length in the direction of movement of the shield plate and is movable synchronously with the movement of the plate to remain parallel with the rows of apertures in the shadow mask. The light source has a small transverse width and is movable or vibratable in the transverse direction. In a particularly useful embodiment, the light emitted from the light source has an intensity distribution such that the light emitted from the end portions in its longitudinal direction is greater than the light emitted from the center portion thereof.

BRIEF DESCRIPTION OF THE DRAWINGS

Other objects and features of this invention will be apparent from the following description taken in connection with the accompanying drawing, in which.

DETAILED DESCRIPTION OF THE INVENTION

Generally, the luminescent screen for a color cathode ray tube having vertically disposed luminescent stripes and light absorbing stripes may be made by two different processes. One of them is a process which first provides the light absorbing stripes on a panel for a color cathode ray tube; the other is a process of first providing luminescent stripes on the panel plate for a cathode ray tube. Either of these two process steps may be followed by the other, but in most cases the process comprising first providing the light absorbing stripes is adopted. In this embodiment, the process of first providing light absorbing stripes will be described first.

Figure 3:
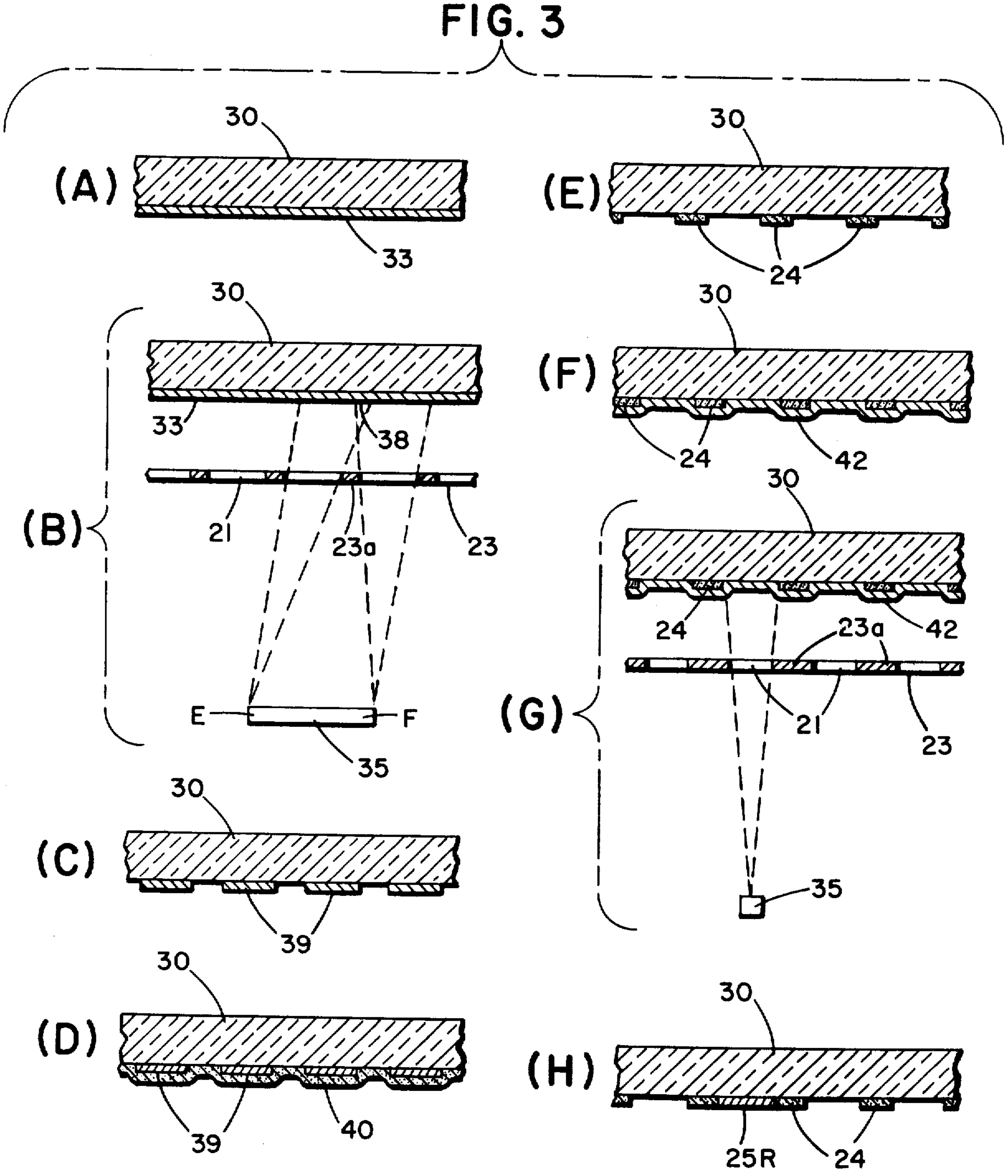
FIG. 3 comprises fragmentary views depicting the manufacturing process of the luminescent screen according to this invention.

Referring to FIG. 3A, a light sensitive layer 33, such as polyvinyl alcohol sensitized with dichromate, is coated on the inner surface of a panel 30. A shadow mask 23 is attached to the panel 30 at a predetermined distance from the inner surface of the panel 30 as shown in FIG. 3B. The shadow mask may be one which is employed in a finished tube, but in general, for the purpose of improving the white uniformity performance, a shadow mask having slightly narrower apertures and slightly wider bridging members than the mask which is employed in a finished tube is used. In this embodiment, a shadow mask having slightly narrower apertures and slightly wider bridging members 23*a* is used. However, if desired, a shadow mask 23 which is employed in a finished tube may be used in this process.

Figure 4:
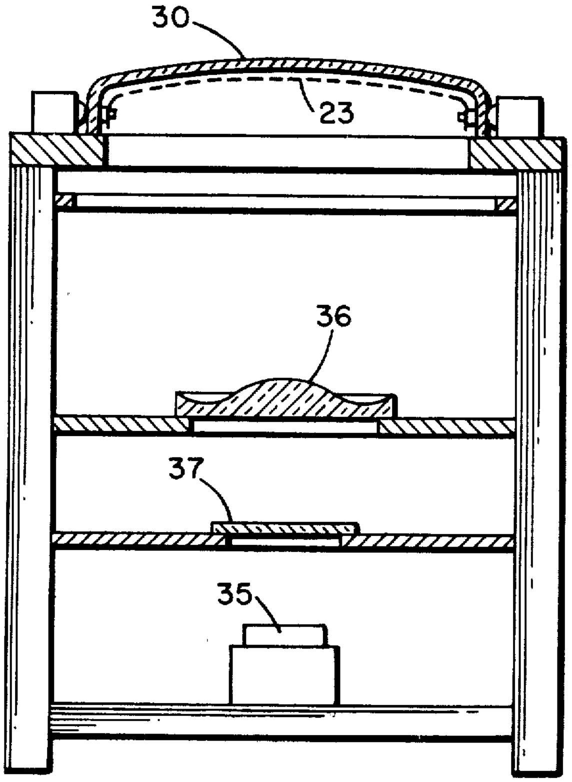
FIG. 4 shows an elevational view, partially in section, of a light exposing apparatus according to this invention, and a panel of a color cathode ray tube set up thereon.

A panel plate with shadow mask affixed thereto is set on a base-plate 34 of a light exposing apparatus, as shown in FIG. 4. Light emitted from a light source 35 passes through a correction lens 36 and a correcting filter 37 and irradiates the shadow mask. The light passed through the aperture 21 of the shadow mask 23 irradiates an opposite portion of the light sensitive layer 33 and polymerizes the polyvinyl alcohol in place. For this step, the light source 35 is located at a positon corresponding to one of the unitary electron guns 29 of the color cathode ray tube. The correction lens 36 corrects the light beam path to correspond to an electron beam passage. The correcting filter 37 equalizes the light intensity at the center and the corner of the panel. In this case, for the purpose of fabricating continuous, even light absorbing stripes throughout the whole length of the panel 30, a light source having substantial length in a direction substantially parallel to the apertures of the shadow mask 23 is adopted. The light exposure step is completed by making three exposures, changing the position of the light source 35 to correspond to each of the three unitary electron guns 29 for one exposure. After the three light exposures, the shadow mask 23 is removed from the panel 30, and the exposed, light sensitive layer on the panel is developed by rinsing water onto the panel. The inner surface of the panel with the polyvinyl stripes is then coated with a light absorbing substance 40 such as aquadag (available, for example, from Acheson Industries) as shown in FIG. 3D. In this figure, the numeral 39 indicates the polyvinyl stripes. After drying the aquadag coating, the polyvinyl stripes 39 are dissolved by applying a solvent suitable for dissolving the polymerized polyvinyl, such as a water solution of hygdrogen peroxide $H_2O_2$; then water is applied by spraying. Aquadag lying on the polyvinyl stripes 39 is removed by this process, leaving the aquadag stripes 24 directly covering the inner surface of panel plate as shown in FIG. 3E.

Figure 2:
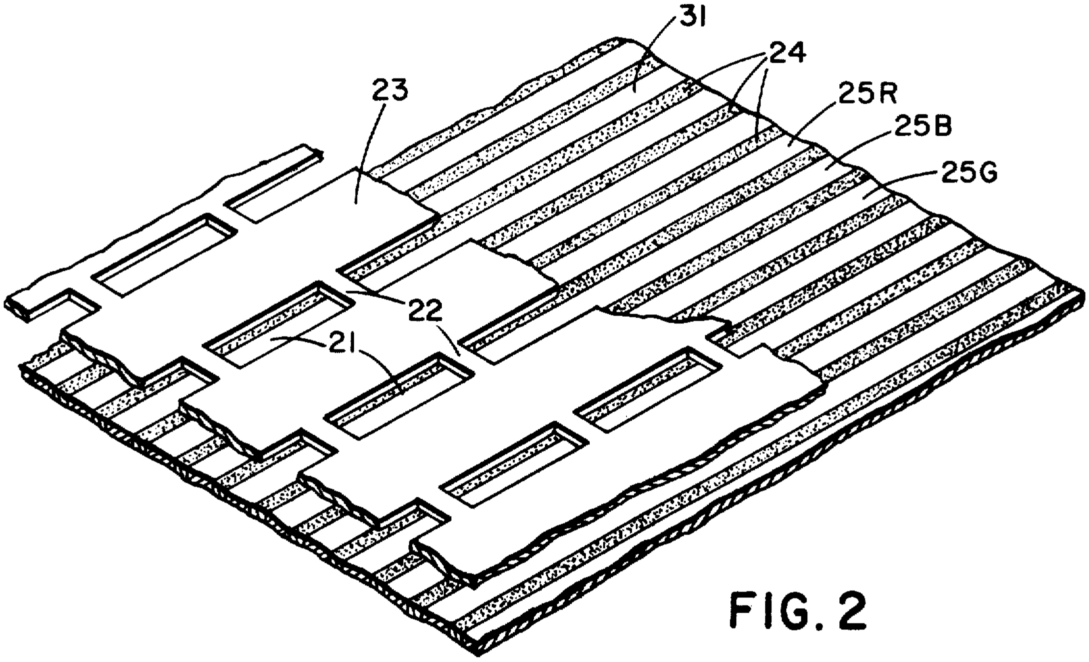
FIG. 2 shows a fragmentary view of a shadow mask and a luminescent screen made according to this invention.

Coating of luminescent stripes 25B, 25G and 25R on the areas situated between each two adjacent light absorbing stripes on the panel plate 30 is performed as described below. The panel plate 30 which has been coated on the inner surface with the light absorbing stripes 24 is now further coated (FIG. 3F) with phosphor slurry coating 42 including polyvinyl alcohol sensitized with dichromate and a phosphor, for example, a red emitting phosphor. The shadow mask 23*a* is attached to the panel 30 coated with the phosphor slurry. The panel 30 with the shadow mask attached is then mounted on the light exposing apparatus. The light source 35 is now positioned at the place where the unitary electron gun, from which electron beam for exciting the red emitting phosphor stripes is emitted (hereinafter referred to as the red gun; similarly the other two guns will be referred to as the green and blue gun, respectively). After a predetermined exposure is performed, the shadow mask is removed from the panel and the panel is developed by spraying water onto the inner surface of the panel. The developed panel is shown in FIG. 3H; the red phosphor remaining on the panel as red emitting luminescent stripes is indicated by the numeral 25R. This process is repeated three times, first for the red phosphor stripes, second for the green phosphor stripes and last for blue phosphor stripes. The finished panel plate is shown in FIG. 2. Numerals 25R, 25G and 25B indicate red, green and blue emitting luminescent stripes, respectively.

The above described process of fabricating a luminescent screen of a color cathode ray tube is a typical process; as a result of this process, the three kinds of unevenness or lack of uniformity in the luminescent screen stated above may occur.

We have found that the first kind of unevenness described above (i.e., random unevenness) occurs when the light source 35 has a width smaller than a few millimeters. A reason for the occurrence of this unevenness is that when particular conditions are satisfied, the apertures of the shadow mask act as a diffraction grid for the light rays emitted from the light source. Generally speaking, the width of the light source emitting light for exposure may be determined as follows. The width of the previously fabricated polyvinyl stripe (i.e., before the fabrication of luminescent stripes) is basically determined by the width of the light source. Or, put another way, the width of the light source may be determined by the width of apertures of the shadow mask and the width of the polyvinyl stripe in question. Practically, the width of light source cannot be fixed to only one value from the above conditions, and many values may be adopted. In practice, a suitable value is selected taking into consideration exposure time and control stability of the width of the polyvinyl stripes.

Figure 5:
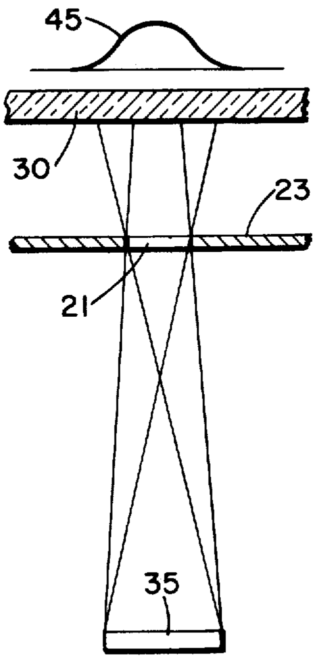
FIG. 5 illustrates light distribution on a polyvinyl layer on a tube screen in the transverse direction of an aperture of the shadow mask, without considering diffraction phenomena.

If consideration of light diffraction phenomena caused by the apertures of the shadow mask is omitted, the light image produced on the surface of polyvinyl layer 33 may have an illumination distribution such as shown in FIG. 5. The central portion of the light image may have the highest illumination and the illumination may decrease in the end portions as shown in curve 45 of FIG. 5. Because of this fact, for the purpose of producing the desired polyvinyl stripes 39, it may be assumed that a polyvinyl stripe having a predetermined width may be produced by controlling the width of the light source and the exposure time to produce substantial illumination of the polyvinyl layer over a width less than the width of predetermined polyvinyl stripes 39. For this purpose, it is obvious that in this case, a light correcting filter will be necessary. Generally the width of the light source determined from such considerations may be on the order of several millimeters. On the other hand, the light source has a longitudinal length of the order of 20 millimeters to avoid the existence of the unevenness of the third kind (i.e., bridge shadows). Such a light source emits a considerable quantity of light energy, and control of exposure time or control of the width of the polyvinyl stripe becomes very critical. From these reasons, for the purpose of reliably fabricating polyvinyl stripes having predetermined width, it is necessary to determine the width of light source to the order of 1 millimeter or less.

Figure 6:
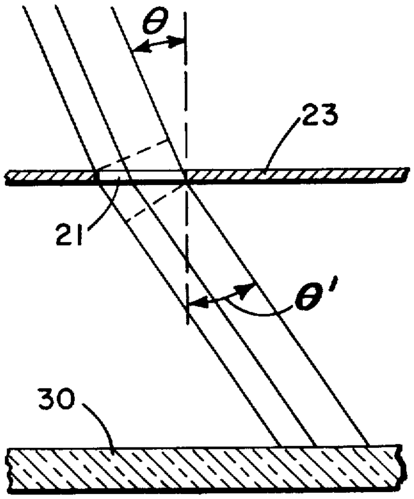
FIG. 6 is an explanatory diagram of the light diffraction due to the aperture of the shadow mask.

A light source having such a narrow width as on the order of 1 millimeter, for example, gives rise to other problems. Generally, when apertures in the shadow mask have widths of the order of 0.1 millimeter and the light source has a width of the order of 1 millimeter or less, the screen apertures act as a diffracting grid, i.e., the light rays tend to be diffracted by the apertures. Referring now to FIG. 6, when parallel light rays fall on the shadow mask at an angle $\theta$ with respect to a line normal to the shadow mask and continue on to the inner surface of the panel plate at an angle $\theta'$ with respect to this normal line, and when the width of an aperture 21 is S and the distance between the shadow mask 23 and the inner surface of the panel plate 30 is $q$, and light ray having wave length $\gamma$ is used, then at the place on the panel 30 satisfying the formulae $$S(\sin\theta - \sin\theta') = m\gamma \qquad 1.$$

where $m = \pm1, \pm2 \ldots$ become dark, and the place on the panel 30 satisfying the formulae:

$$S(\sin\theta - \sin\theta') = (2m-1)\,\gamma/2 \qquad 2.$$

where $m = \pm1, \pm2 \ldots$ become bright. Accordingly the light image produced on the panel 30 under such conditions by one aperture inevitably produces a plurality of bright stripe images as shown in FIG. 7.

Figure 7:
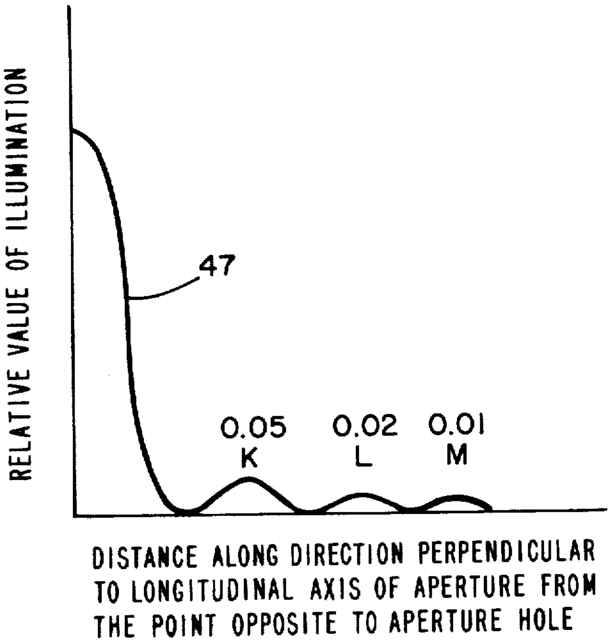
FIG. 7 shows the resulting light energy distribution on the panel due to the light diffraction by the aperture of the shadow mask.
Figure 8:
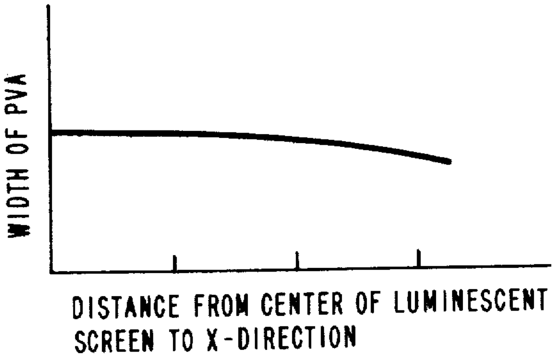
FIG. 8 shows a modification of the width of polyvinyl stripes (PVA) used to form the light absorbing stripes.

To consider a specific example, when $\theta=0$ (e.g., on the Y-axis in FIG. 1) =4000A, $S$=0.11m/m, $q$=8.0m/m abscissas of K, L and M lie at 15$\mu$, 44$\mu$, and 73$\mu$ respectively, as shown in FIG. 7, and in this case, the resulting width of the polyvinyl stripe is 130$\mu$. In other words, the half value of the resulting width of the polyvinyl stripe lies at the midpoint between L and M. At the extreme point in the X- direction on the panel 30 (referring to FIG. 1) the aforementioned K, L and M abscissas lie at the points 21$\mu$, 62$\mu$, and 10$\mu$, respectively. In this case the resulting width of the polyvinyl stripe is 80$\mu$, in other words, the half value of the resulting width of the polyvinyl stripe lies at the mid-point between K and L. It shows that the formation of polyvinyl stripes having widths as shown in FIG. 8 becomes very difficult even if a correcting filter is utilized. In other words, becasue of diffraction phenomena, light ray energy distribution does not follow the curve 45 shown in FIG. 5, and from this fact, even if ample exposure time is invested in providing polyvinyl stripes having predetermined widths, such as extending to a midpoint between L and M in the center portion of the panel, or to a midpoind lying between K and L in farthest position from the center of the panel in the X-direction, only partial polyvinyl stripes at the points M or L may be provided.

It is necessary to produce light energy distribution equivalent to the curve 45 shown in FIG. 5, even if a light source having a narrow width is adopted and diffraction phenomena takes place. This invention accomplishes this in the following manner.

Figure 9:
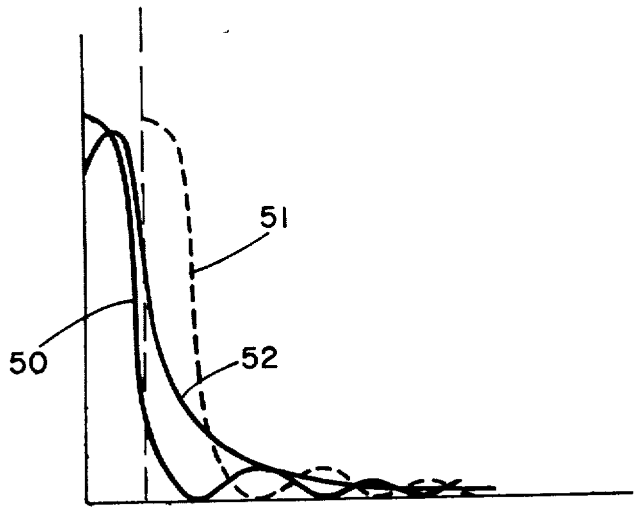
FIG. 9 is an explanatory diagram of the elimination of the effect of diffraction.

FIG. 9 shows that when a light ray is vibrated in the transverse direction with a substantial amplitude, superposed light energy results in a distribution equivalent to that shown by the curve 45 in FIG. 5 even if there exists diffraction phenomena; that is, in this case, bright and dark parts resulting from diffraction phenomena are superposed on each other, and the resultant energy distribution shows a gradually decreasing curve similar to that shown by the curve 45 in FIG. 5.

Figure 10:
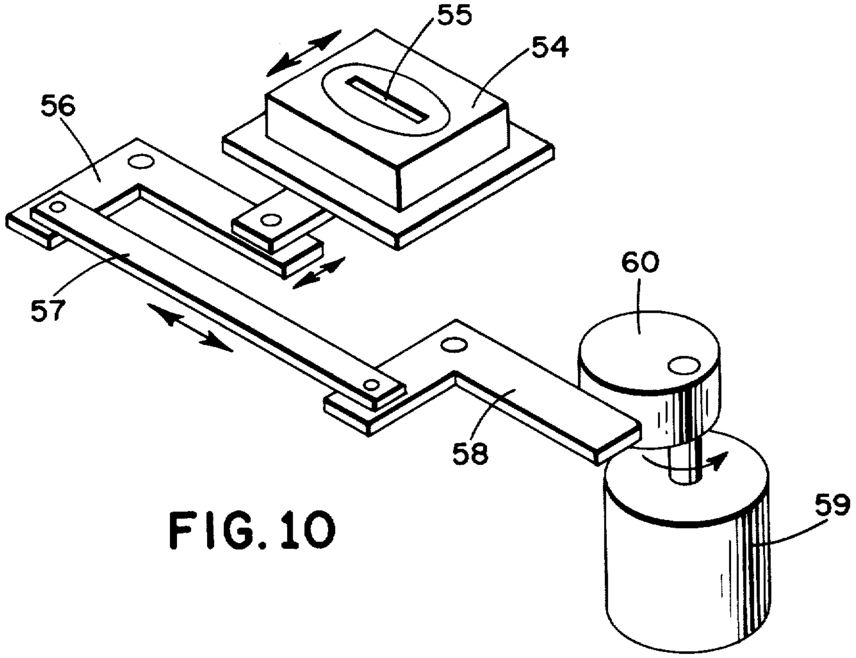
FIG. 10 shows a light source moving mechanism for eliminating the effect of light diffraction.

One example of apparatus for vibrating a light source is shown in FIG. 10. The light source comprises a lighthouse 54 in which a super high pressure mercury vapor lamp of tubular type is received. On the upper surface of the lighthouse 54 is provided a slender light transparent window 55. The lighthouse 54 is rotatably connected to the first arm 56 of three arms 56, 57 and 58 each connected rotatably as shown in FIG. 10. One end of the third arm 58 is engaged slidably by an eccentric cam 60 which is rotated by means of a driving motor 59. The light source 35 is thereby vibrated in the direction perpendicular to its longitudinal direction shown by arrow FIG. 10 through the arms 56, 57 and 58.

The gradually decreasing light energy distribution equivalent to that shown by the curve 45 in FIG. 5 can be obtained on the polyvinyl film coated onto the panel plate 30 by utilizing the exposure apparatus having a light source which has movement as described above even if there exists diffraction phenomena. Accordingly, the polyvinyl stripes having predetermined width shown in FIG. 9 can be obtained by utilizing a correction filter and controlling light exposure time in the same manner as described hereinabove. The vibrating or oscillating period of the light source 35 is sufficient if the halfcycle vibration is performed to eliminate the unevenness of the first kind caused by light diffraction; but in practice, some restriction or limitation described hereinafter exists for the purpose of elimination of unevenness of the second kind at the same time.

For example, a lighthouse having a slender light transparent window of 0.8m/m in width was successfully used with vibrating amplitude of 0.5m/m and a vibrating frequency of several cycles/second. The light absorbing stripes were provided with a width error within 10$\mu$. The resultant light absorbing stripes having tolerance within 10$\mu$ are much more precise than those fabricated by other methods or processes for making color cathode ray tubes of this kind (generally, light absorbing stripes fabricated by other processes have a tolerance of the order of ±50). Moreover, because the width of the light source window is substantially reduced, the light exposure time becomes very easy to control.

The second kind of unevenness or lack of uniformity is caused by the facts described below. A shadow mask having a concave surface is used in this color tube (the panel plate has also a concave inner surface). On the other hand, the light source 35 used for exposure purposes has a substantial longitudinal length in the longitudinal direction of the apertures of the shadow mask and has a narrow width in the transverse direction of the apertures. In this case a line tangent to a point on the shadow mask drawn in the longitudinal direction of the aperture makes an angle with the longitudinal axis of the light source. This lack of parallelism between the tangent lines on the shadow mask and the longitudinal axis of the light source is the reason for the unevenness or lack of uniformity of the second kind.

To eliminate or reduce the unevenness or lack of uniformity of the second kind, the longitudinal axis of the light source must be kept as parallel as possible with the aforementioned tangents on the shadow mask.

Figure 1:
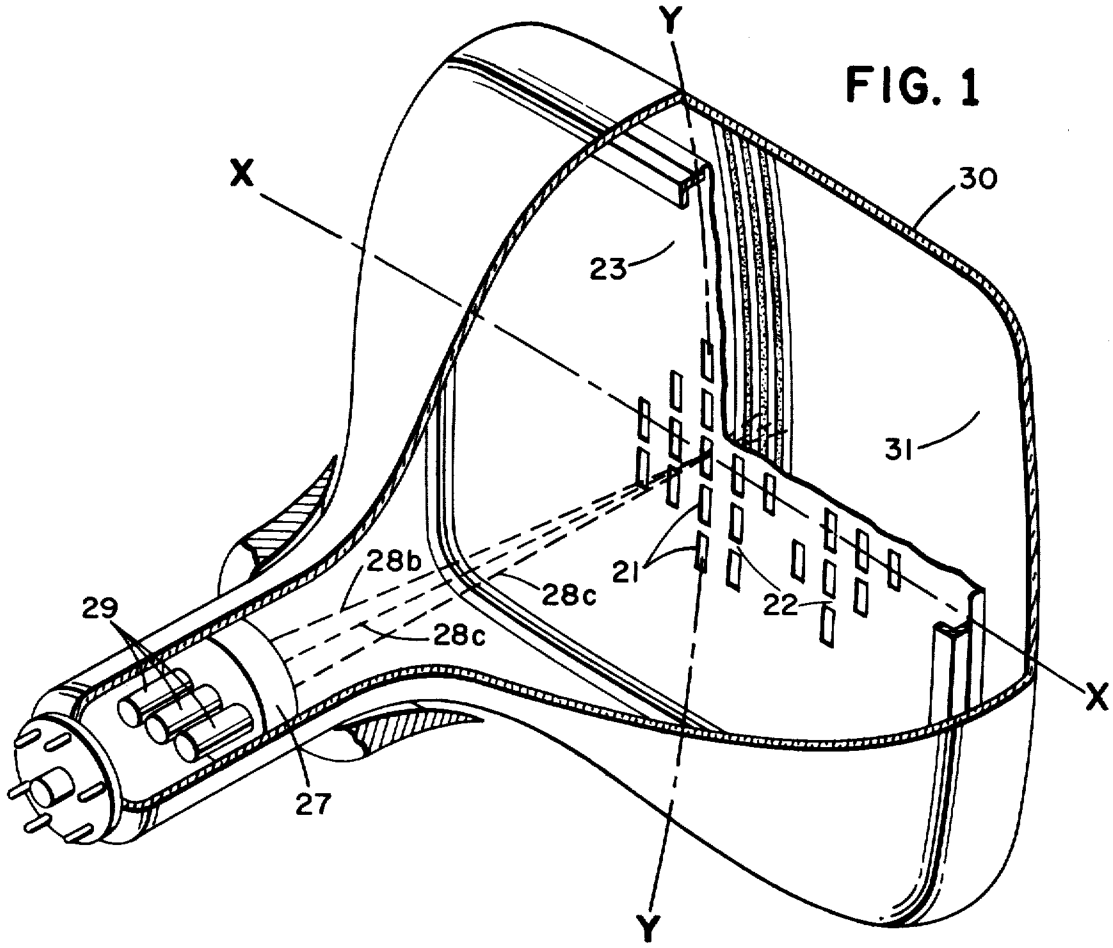
FIG. 1 shows a partially cut away perspective view of a color cathode ray tube employing a luminescent screen made according to this invention.
Figure 12:
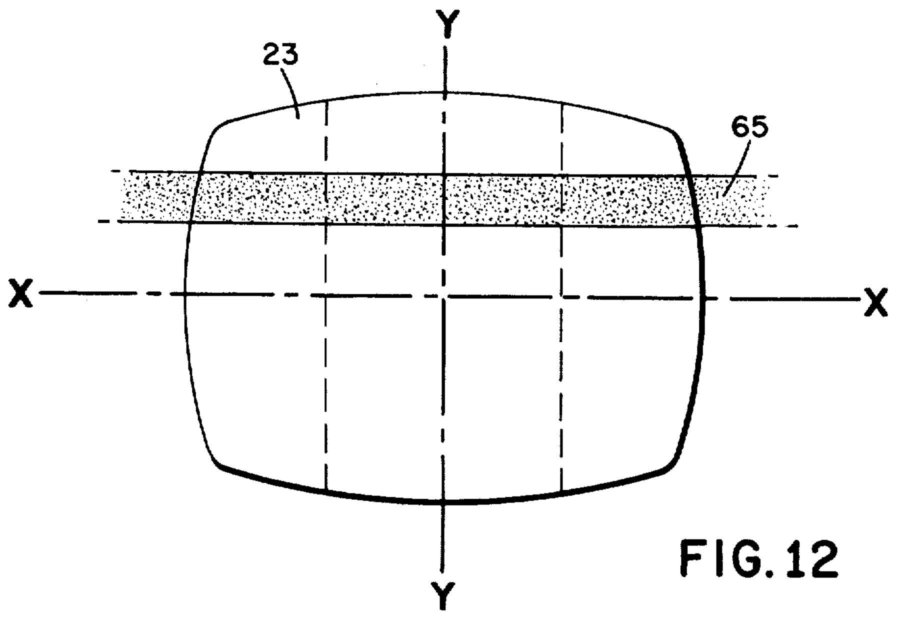
FIG. 12 is an explanatory diagram of the elimination of unevenness of the second kind caused by a lack of coincidence between the longitudinal extent of the light source and the tangential disposition of the shadow mask apertures.
Figure 11:
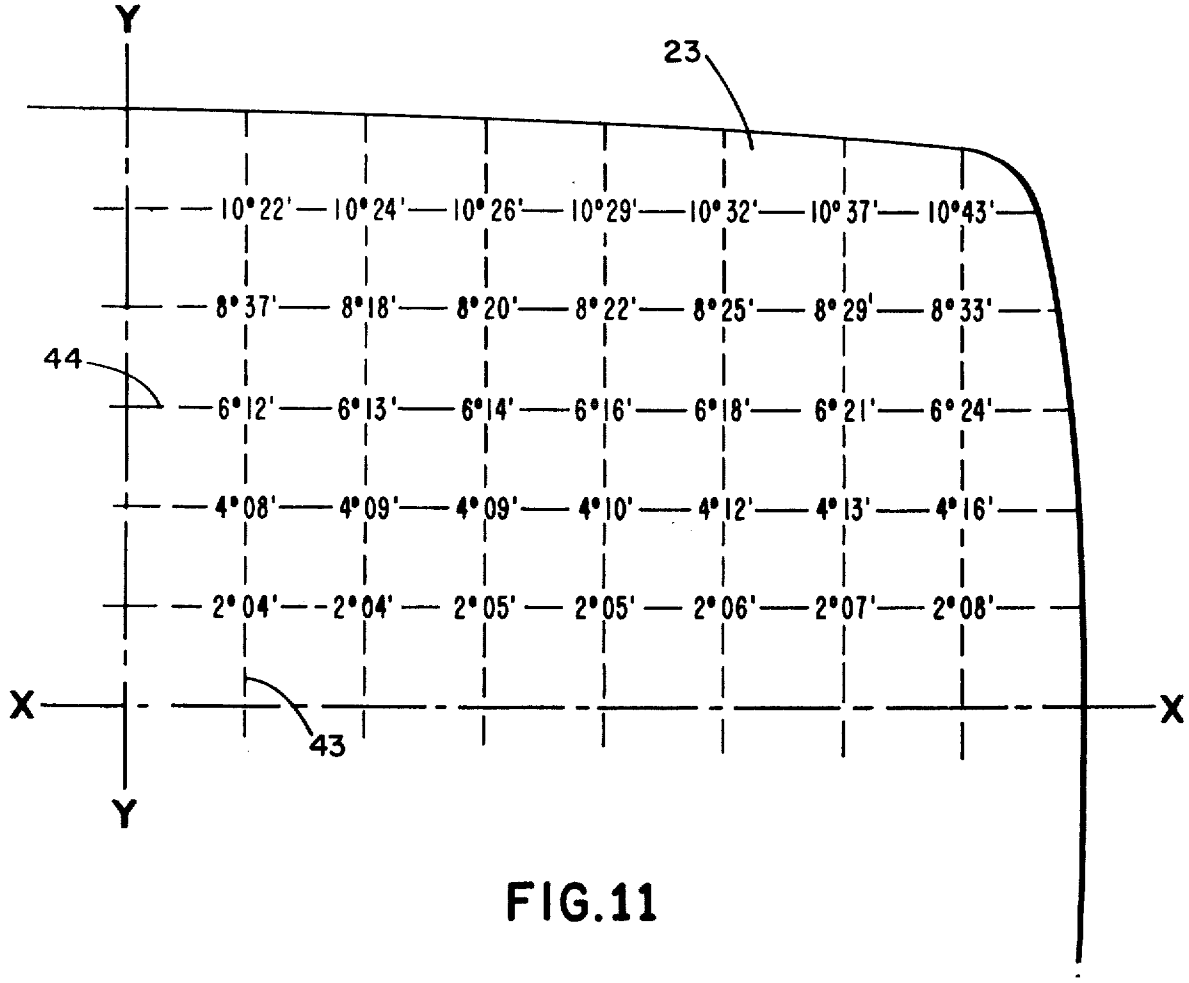
FIG. 11 shows the distribution of angles of inclination between horizontal lines and tangents taken in a longitudinal direction of the shadow mask.

Referring now to FIG. 11, spherically formed shadow mask 23 has an increasing inclination in the Y-direction (FIG. 1). FIG. 11 shows a distribution of the inclination angles between the Y- axis and longitudinal tangent lines at cross points of two groups of parallel lines, each group of parallel lines being parallel to the X- or Y- axis respectively and being disposed at equal distances from neighbouring parallel lines. In FIG. 11, only the first quadrant is shown, but it will be easily understood that in each other quadrant, this distribution of inclination appears, symmetrical with X- or Y- axis. It will be easily observed that the inclination of the spherically formed shadow mask tends to vary considerably in the Y- axis direction, but in the X- axis direction the variation of inclination is substantially negligible. It is difficult to satisfy strictly the condition that the longitudinal axis of the light source be parallel to all tangents in the Y- direction of the shadow mask. But, according to FIG. 11, from the fact that inclinations of the tangents at the points having equal or nearly equal Y- value have a substantially equal angular value; and if the exposure area is limited to an elementary area 65 having nearly equal inclination in the Y- direction, and extending in the X- direction as shown in FIG. 12; and further if for each position of the area 65 the light source 35 is inclined to the angle equal to the mean value of inclinations of tangents in this area, it is obvious that the unevenness or lack of uniformity of second kind may be reduced or substantially eliminated. Accordingly the exposing process is successfully performed by moving the elementary area 65 in the Y- axis direction while inclining the light source to an angle of inclination equal to the mean value of inclinations of the tangents within that area. By this exposing process, a luminescent screen having favorable uniformity concerning the second kind of unevenness is provided.

Figure 13:
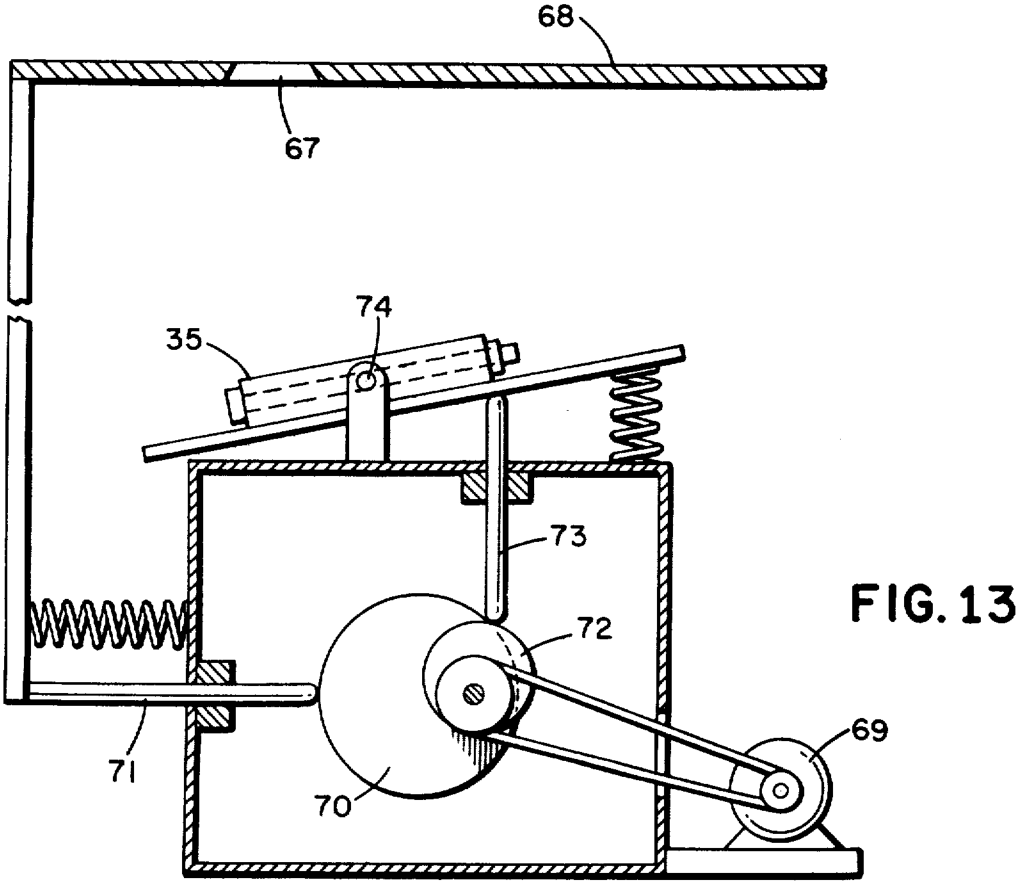
FIG. 13 shows apparatus for making screens which eliminates the unevenness illustrated with respect to FIG. 12.

FIG. 13 shows one example of the exposure apparatus according to the aforementioned principle. In this apparatus, a shield plate 68 is provided between the shadow mask 23 and the light source 35. The shield plate 68 has a light passing slit 67 extending in the direction perpendicular to its moving direction, and has narrow width in the direction of the movement such as shown by 65 in FIG. 12. This shield plate is moved in the Y- axis direction by means of a rotating cam 70 driven by a motor 69 through a lever 71. Meanwhile the light source 35 is swingably rotated around a shaft 74 by means of a cam 72 also rotated by the motor 69 through a movably mounted shaft 73, as shown in FIG. 13. The inclination of the light source 35 is synchronized with the movement of shield plate 68 as is apparent from FIG. 13. The inclination of the light source 35 is so performed that the elementary area of the shadow mask being irradiated by light through shield plate 68 is substantially parallel to the longitudinal axis of the light source 35.

For the sake of clarity, FIG. 13 shows only the mechanism to eliminate or decrease the second kind of unevenness or lack of uniformity; practical exposure apparatus may have not only this mechanism but also mechanism as shown in FIG. 10.

Utilizing the exposure apparatus of this type to produce luminescent screens for color cathode ray tubes, the longitudinal axis of the light source remains substantially parallel to the aforementioned tangent line of the curved shadow mask, and because of this fact, unevenness or lack of uniformity of the second kind can be substantially eliminated or reduced. Because the unevenness or lack of uniformity of the second kind appears in places distant from X- and Y- axis, where large beam landing tolerance is required, this reduction or elimination of unevenness or lack of uniformity of the second kind provides high quality received images on the color cathode ray tubes.

Concerning the third kind of unevenness or lack of uniformity, (i.e., aperture bridge shadows) existence of this kind of unevenness or lack of uniformity originates from the existence of the bridging portion 22 between each aperture in a row of apertures, resulting in umbra or penumbra on the polyvinyl layer 33 on the panel 30. This unbra or penumbra generated at the portion of the polyvinyl layer 33 opposite to the bridging portion of the shadow mask gives rise to unevenness in that portion of the polyvinyl stripes 39 or in the light absorbing stripes 24. To reduce this unevenness of the third kind, it is necessary to use a light source having substantial length in Y- direction. But adoption of a light source having substantial length in Y- direction in the exposure apparatus has only limited effectiveness in reducing the third kind unevenness, and in a finished tube, perceptible unevenness of the third kind still remains. The reason for this is as follows: On the portion of the polyvinyl layer opposite to the bridging portion of the shadow mask less light energy is received from a rectangular light source having narrow width and substantial length than is received by the portion opposite the aperture portion of the shadow mask, thus causing narrower portions in the phosphor stripes.

Figure 14:
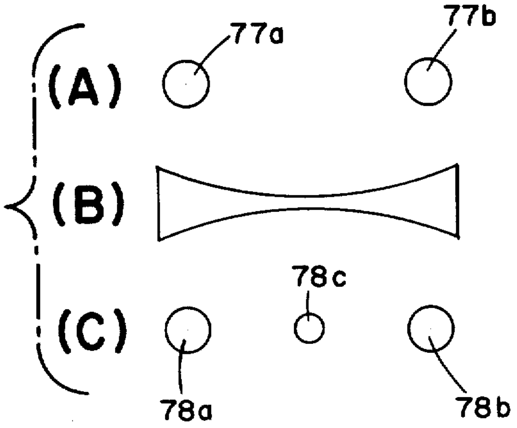
FIG. 14 shows a configuration for the light emitting part of a light source.

To reduce or eliminate this unevenness, it is necessary that the light energy received at the portion opposite to the bridging member of the shadow mask in polyvinyl layer 38 and the light energy received at the portion opposite to the aperture portion must be equal or as nearly equal as possible. With respect to the elimination of at least the umbra of the bridging portion on the polyvinyl layer, the length of the light source may be determined by the factors such as the width of bridging member and the distance between the shadow mask and the panel. Next, it is necessary to design the means for emitting light and thereby control the amount of light emitted from each portion of the light source by determining the shape or configuration of the light passing window of the light source. FIG. 14 A–C show some examples of shapes or configurations of such window for this purpose. In FIG. 14A, the light emitted from the vapor discharge lamp passes only through two apertures or holes provided at both longitudinal ends of the necessitated length of lamp as described above. In FIG. 14B, the light passing window has a configuration so as to permit more light from the vapor discharge lamp to pass both ends of the window than at the central portion thereof. In FIG. 14C, a plurality of light passing apertures having different diametes (in this figure, three light passing apertures **78*a*, 78*b* and 78*c*** are shown) are provided. In this embodiment, the holes located near or at both ends of the lamp have larger diameters than the hole disposed at the central portion.

When the exposure is preformed with a light source 35 having substantial length extending in Y- direction and emitting more light at both ends of the light source that at the central portion thereof, light distribution at the portion of polyvinyl layer opposite to the bridging member of the shadow mask becomes equal or nearly equal to that at the portion of polyvinyl layer opposite to the aperture of the shadow mask, and the unevenness or lack of uniformity of the third kind is much reduced or eliminated.

Hereinbefore, an embodiment of this invention has been described to provide the light absorbing stripes with no or reduced unevenness, and this invention can be fully employed in the formation of luminescent stripes emitting red, green or blue light when irradiated with electron beams. Moreover, of course, it can be applied to the process in which the luminescent stripes are provided first, and then are provided light absorbing stripes. In this description, a shadow mask with a slightly differed dimension of aperture width and length of bridging member from that employed in the finished tube is used in the exposure process; but if desired, the shadow mask which will be employed in the finished tube may be of course utilized in the exposure process. Also, the process according to this invention is applied successfully to other color cathode ray tubes to reduce or eliminate the unevenness or lack of uniformity described herein.

We claim:

1. An apparatus for preparing a developable pattern comprising continuous vertical stripes on a panel for a cathode ray tube having a film comprising photosensitive material having a predetermined response to incident light, said panel having a concave shadow mask attached thereto, said shadow mask having on its concave face a number of beam-passable apertures separated by bridge members and arranged in rows parallel with each other, comprising:
   a. a light source placed at a predetermined position with respect to said panel on the opposite side of said mask from said panel for projecting light on said film on said panel in a pattern comprising images defined by the apertures of said shadow mask, said light source having an effective length in the lengthwise direction of the rows of the apertures greater than the length of one of the beam-passable apertures in the shadow mask to extend the image of each aperture on said panel in the lengthwise direction to reduce the effects of the shadow cast by said bridge members on said film and form said continuous vertical stripes; and
   b. means for vibrating said light source at least along a direction perpendicular to the longitudinal axis of said light source and parallel to said panel with predetermined amplitude and frequency to create a superposed image on said screen from said light source through each of said apertures and thereby substantially reduce diffraction phenomena effects created by the edges of each such aperture on the pattern of radiation on said screen.

2. An apparatus for preparing a developable pattern comprising a plurality of light absorbing stripes and light emitting electroluminescent stripes each separated by one of the light absorbing stripes on a panel for an electroluminescent screen of a color cathode ray tube, the panel having a film thereon comprising a photosensitive material having a predetermined response to incident light, the screen having a shadow mask attached thereto, said shadow mask having on its concave face a number of beam-passable apertures arranged in rows parallel with each other and with said electroluminescent stripes, said apertures in each of said rows being separated from each other by beam-intercepting bridging portions in each of the rows, comprising:
   a. a light source placed at a predetermined position with respect to said apertures in said screen and on the opposite side of said screen from said panel for projecting light on said panel through the apertures of said shadow mask, said light source having an effective length in the lengthwise direction of the rows of the apertures greater than the length of one of said apertures plus the length of the bridge portions at either end of said one aperture to produce on said panel bright images of each said aperture so expanded in the lengthwise direction of the rows of the apertures as to be connected with the adjacent bright images of the apertures along the length of each of the rows;

b. means for limiting the irradiated area on the shadow mask to a short length covering a part of the length of the rows of the apertures, the length of said irradiated area having substantially the same angle of inclination with respect to the vertical axis of said screen;

c. means for moving said irradiated area on the shadow mask along the length of the rows of the apertures;

d. means for vibrating said light source with predetermined frequency in a direction perpendicular to the axis of said light source and parallel to said panel to eliminate diffraction phenomena effects caused by the edges of each said one aperture; and e. means for inclining said light source to keep it always substantially parallel to tangents to the rows of apertures in said irradiated area.

3. An apparatus according to claim 2 wherein said means for limiting the irradiated area on the shadow mask comprises a light passable opening of sufficient width to allow the irradiated area to cover all the number of the rows of the apertures.

4. An apparatus according to claim 2 wherein said means for limiting the irradiated area on the shadow mask comprises a shield plate having an opening for limiting the path of the light.

5. An apparatus according to claim 3 wherein said means for limiting the irradiated area on the shadow mask comprises a shield plate having said opening therein for limiting the path of the light.

6. An apparatus according to claim 2 wherein said means for moving the irradiated area are operated synchronously with said means for inclining the light source.

7. An apparatus according to claim 3 wherein said means for vibrating said light source in the direction perpendicular to the axis of said light source operates at a frequency substantially greater than the frequency at which the means for moving said irradiated area causes the irradiation of all of said panel.

8. An apparatus according to claim 1 wherein said light source includes means for emitting a greater amount of light at the extreme positions of the light source along the longitudinal axis thereof than is emitted at the central portion of said light source.

9. An apparatus according to claim 2 wherein said light source includes means for emitting a greater amount of light at the extreme positions of the light source along the longitudinal axis thereof than is emitted at the central portion of said light source.

10. An apparatus according to claim 8 wherein said light source emitting means includes an area of greater width at said extreme positions on said longitudinal axis than the width of an emitting area at said central portion of said source.

11. An apparatus according to claim 9 where said light source emitting means includes an area of greater width at said extreme positions on said longitudinal axis than the width of an emitting area at said central portion of said source.

12. An apparatus according to claim 8 wherein said light source emitting means includes means for emitting light only from both said extreme positions along the longitudinal axis of said source.

13. An apparatus according to claim 9 wherein said light source emitting means includes means for emitting light only from both said extreme positions along the longitudinal axis of said source.

14. An apparatus according to claim 8 wherein light source emitting means includes means for emitting light only from both said extreme positions on said longitudinal axis and said central portion of said source, said light emitted from said central position being limited to a quantity smaller than that emitted from each of said extreme positions of said source.

15. An apparatus according to claim 9 wherein light source emitting means includes means for emitting light only from both said extreme positions on said longitudinal axis and said central portion of said source, said light emitted from said central position being limited to a quantity smaller than that emitted from each of said extreme positions of said source.

* * * * *